United States Patent [19]

Muis

[11] Patent Number: 5,465,649
[45] Date of Patent: Nov. 14, 1995

[54] APPARATUS FOR PREPARING BEVERAGES SUCH AS COFFEE, SOUP, TEA OR THE LIKE

[75] Inventor: Jan A. Muis, Odijk, Netherlands

[73] Assignee: Sara Lee/De N.V., Keulsekade, Netherlands

[21] Appl. No.: 159,270

[22] Filed: Nov. 30, 1993

[30] Foreign Application Priority Data

Dec. 1, 1992 [NL] Netherlands ............................ 9202085

[51] Int. Cl.⁶ ................................ A23F 5/24; A47J 31/10
[52] U.S. Cl. .............................. 99/280; 99/289 P; 99/300
[58] Field of Search ............................. 99/280, 283, 287, 99/289 P, 289 R, 289 DB, 299, 300, 302 R, 316

[56] References Cited

U.S. PATENT DOCUMENTS

| | | | |
|---|---|---|---|
| 3,423,209 | 1/1969 | Weber | 99/71 |
| 4,478,139 | 10/1984 | Zimmerman | 99/280 |
| 4,767,632 | 8/1988 | Meier | 426/231 |
| 4,858,523 | 8/1989 | Helbling | 99/302 R |
| 4,966,070 | 10/1990 | Frisch | 99/302 R |
| 5,083,503 | 1/1992 | Van Hattem | 99/302 R |
| 5,115,730 | 5/1992 | Gockelmann | 99/300 |
| 5,255,593 | 10/1993 | Bunn | 99/289 R |

FOREIGN PATENT DOCUMENTS

| | | |
|---|---|---|
| 0100030 | 2/1984 | European Pat. Off. . |
| 0369542 | 5/1990 | European Pat. Off. . |
| 0399078 | 11/1990 | European Pat. Off. . |
| 0419398 | 3/1991 | European Pat. Off. ............. 99/289 D |
| 1184141 | 7/1959 | France . |
| 3615158 | 7/1987 | Germany . |

OTHER PUBLICATIONS

Matsushita Electric Ind. Co. Ltd.; "Coffee Percolator"; Mar. 1993; *Patent Abstracts of Japan* #JP4312417.
Toshiba Electric Appliance Co. Ltd.; "Drink Feeder"; Aug. 1991; *Patent Abstracts of Japan* #JP3128017.

*Primary Examiner*—David Scherbel
*Assistant Examiner*—Randall E. Chin
*Attorney, Agent, or Firm*—Longacre & White

[57] ABSTRACT

The invention relates to a method of preparing beverages such as coffee, tea, soup or the like through extraction, in which the product to be extracted is accommodated in a chamber and is confined by a piston, whereafter liquid is supplied to the chamber via a liquid supply duct provided in the piston, the product to be extracted being extracted and the extract being discharged from the chamber. During the supply of liquid the flow rate is measured and, depending on these measurements, the supply of liquid is regulated in such a manner that for a specified desired total amount of extract the time of contact between the liquid and the product to be extracted has a predetermined desired duration.

The invention further relates to an apparatus for carrying out the method, this apparatus comprising chambers of equal dimensions.

13 Claims, 5 Drawing Sheets

FIG. 5(A)   FIG. 5(B)   FIG. 5(C)
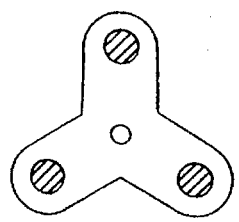 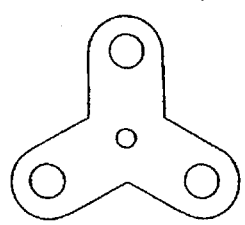 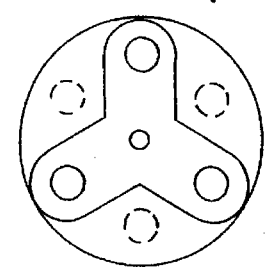
FIG. 5(D)
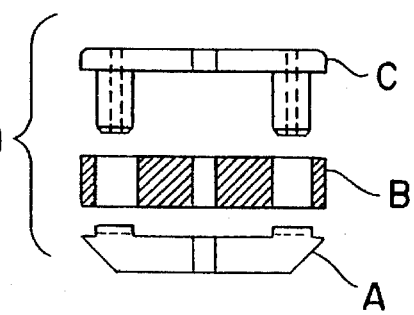
FIG. 5(E)   FIG. 5(F)   FIG. 5(G)
FIG. 5(H)   FIG. 5(K)   FIG. 5(L)
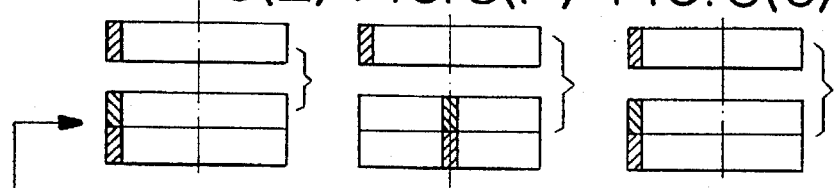
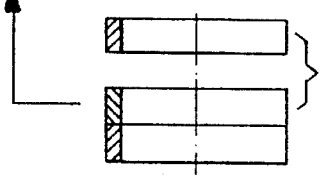
FIG. 5(M)

APPARATUS FOR PREPARING BEVERAGES SUCH AS COFFEE, SOUP, TEA OR THE LIKE

This invention relates to a method of preparing beverages such as coffee, tea, soup or the like through extraction, in which the product to be extracted is accommodated in a chamber bounded at one axial end by a removable cover with an extract discharge opening, subsequently the product to be extracted is confined in this chamber by a piston from an axial end of the chamber that is located opposite the cover, whereafter liquid is supplied to the chamber via a liquid supply duct provided in the piston, the product to be extracted being extracted for a specified time of contact and the extract being discharged via the extract discharge opening.

Such a method is disclosed in European patent application 0 369 542. The known method, which is quite satisfactory as such, is susceptible to further improvement.

In the known method the liquid is continuously supplied to the chamber at a constant pressure and flow rate. Accordingly, the chamber is so dimensioned that, with this continuous supply of a specified desired total amount of liquid and with a specified amount of starting product to be extracted, a desired duration of the time of contact between the liquid and the product to be extracted is achieved. The fact is, however, that in different countries, particularly in the case of coffee, quite different requirements are imposed on the extract. For instance, in the United States 160 ml of extract is prepared with 5 grams of coffee, whilst in Denmark 15 grams of coffee are used to prepare the same amount of extract. As a consequence of this, it is impossible to make Danish coffee with an apparatus comprising a chamber whose dimensions are tailored to an American cup of coffee. The bottom surface of the chamber of the American apparatus is too small for that purpose. Conversely, it is impossible to make an American cup of coffee using an apparatus with a relatively large bottom surface, intended for the Danish market. The small amount of coffee in the relatively large chamber leads to a thin coffee bed in the chamber, which in turn has as a consequence that the duration of the time of contact between the liquid and the coffee bed becomes too short and accordingly a very weak extract is obtained.

The object of the present invention is to provide a method of preparing beverages without the above-mentioned drawback.

To that end, the method of the present invention is characterized in that a parameter corresponding with the amount of liquid supplied is measured and, depending on these measurements, the supply of liquid is regulated in such a manner that for a specified desired total amount of extract the time of contact between the liquid and the product to be extracted has a predetermined desired duration.

Generally, the apparatuses that are used for carrying out the present method comprise several chambers. If only one cup of coffee is to be made, only one of the chambers is used, and if a pot of coffee is to be prepared, several chambers are used simultaneously.

It is particularly advantageous, in accordance with a further elaboration of the invention, if the duration of the time of contact is substantially equal for every amount of extract to be prepared, independently of the desired strength of the extract. This provides the advantage that the preparation of both small and large amounts of extract takes approximately the same amount of time. The only condition that needs to be adapted to the amount of extract to be prepared is the amount of starting product to be accommodated in the chambers for extraction.

In further elaboration of the invention, the duration of the time of contact is approx. 10–20 seconds at a liquid supply pressure of approx. 2 bar. Such a duration for the preparation of a specified amount of coffee has been found to be quite satisfactory in practice.

In accordance with a further elaboration of the present invention, the flow rate at which the liquid is supplied to the chamber can be regulated continuously. Such continuous regulation has the advantage that it can be realized simply and reliably with a flow control valve.

In accordance with a further elaboration of the invention, however, it is particularly advantageous if the flow rate at which the liquid is supplied to the chamber is regulated in that the supply of liquid is periodically interrupted for a short period of time, in such a manner that the desired total amount of liquid is supplied over the total span of the desired time of contact.

Such regulation leads to a pulsating supply of liquid to the chamber. The pulsating liquid stream causes whirls in the layer of starting product to be extracted, so that a better contact between the liquid and the starting product is realized. Such better contact between the liquid and the starting product to be extracted in turn has as a consequence that less starting product will suffice to obtain an extract of a particular strength.

The present invention further relates to an apparatus for preparing beverages such as coffee, tea, soup or the like through extraction, comprising:

- a first housing part with at least two chambers which are adapted for receiving a starting product to be extracted and which are each provided at least at one axial end thereof with an opening which is closable with a cover comprising an extract discharge opening;
- at least two pistons each being slidable relative to the chambers in axial direction of the respective chambers, and which are each adapted for confining in the chamber an amount of starting product to be extracted, the chamber being bounded by the chamber walls, the cover and the piston;
- at least one liquid supply device comprising a meter for measuring a parameter corresponding with the amount of liquid supplied and at least one shut-off valve for interrupting the supply of liquid, the liquid supply device being connectible by an inlet thereof to a liquid source, such as for instance the water supply system, and being connectible by at least one outlet thereof to liquid supply ducts provided in the pistons, these liquid supply ducts being adapted for supplying liquid to the relevant chamber; and
- a control adapted for controlling the entire apparatus.

Such an apparatus is likewise disclosed in European patent application 0 369 542. The known apparatus has a drawback in that the different chambers thereof have mutually different dimensions. Moreover, it is impossible to produce a single type of apparatus for all countries on account of the different requirements imposed on e.g. coffee in different countries. This means that in order to be able to meet the desires of the different countries, a variety of molding dies are required for the production of the apparatus, which is mostly manufactured from synthetic material. This entails considerable additional costs, which is a major disadvantage.

Accordingly, the object of the present invention is to provide an apparatus of the above-described type without the drawbacks mentioned.

To that end, the apparatus of the invention is characterized in that the chambers have equal dimensions and that the control is designed such that for a specified desired amount of extract the time of contact between the liquid and the product to be extracted has a predetermined desired duration.

Such an apparatus can be supplied to all countries and the adaptation of the apparatus that is required to produce different qualities of coffee can be realized by means of the control.

Such an apparatus moreover provides the advantage that the parts that are subject to wear, such as for instance filter plates on which the starting product to be extracted rests during the extraction process and through which the extract is discharged, and liquid distributor plates through which the liquid is introduced into the chamber, have standard dimensions. Accordingly, to be able to supply such parts at a later stage, only one type needs to be kept in stock, which results in considerable savings of cost.

According to a further elaboration of the invention, the duration of the time of contact can be regulated by virtue of the control being adapted for periodically opening and closing the shut-off valve, depending on the parameter measured.

Such a solution requires only an adaptation of the control. The liquid supply device is already provided with all of the necessary controlling and data gathering elements.

In an alternative further elaboration of the invention, the liquid supply device may be provided with a flow control valve which can be controlled via the control, the control being adapted for controlling the flow control valve depending on the parameter measured, in such a manner that, given a specified desired total amount of extract, the desired duration of the time of contact between the liquid and the product to be extracted is achieved.

Such a flow control valve is accurate, reliable in operation, and inexpensive.

It is noted that Dutch patent application 7502730 discloses an apparatus of a different type for preparing extracted beverages using the filtering method. In this apparatus the water supply is also interrupted periodically. However, the purpose of this is to reduce the required power for the water heater, which is designed as a through-flow heat exchanger. This publication does not disclose the interruption of the water supply for the purpose of obtaining a desired duration of the time of contact between the liquid and the product to be extracted. The problem for which the present invention provides a solution does not play a role in the Dutch patent application mentioned because it concerns an apparatus of the filtering type.

To clarify the invention, an embodiment of the apparatus will be described, by way of example only, with reference to the accompanying drawings. In the drawings:

FIG. 5 shows a schematic overview of the operation of the apparatus according to FIGS. 3 and 4.

Figure 1:
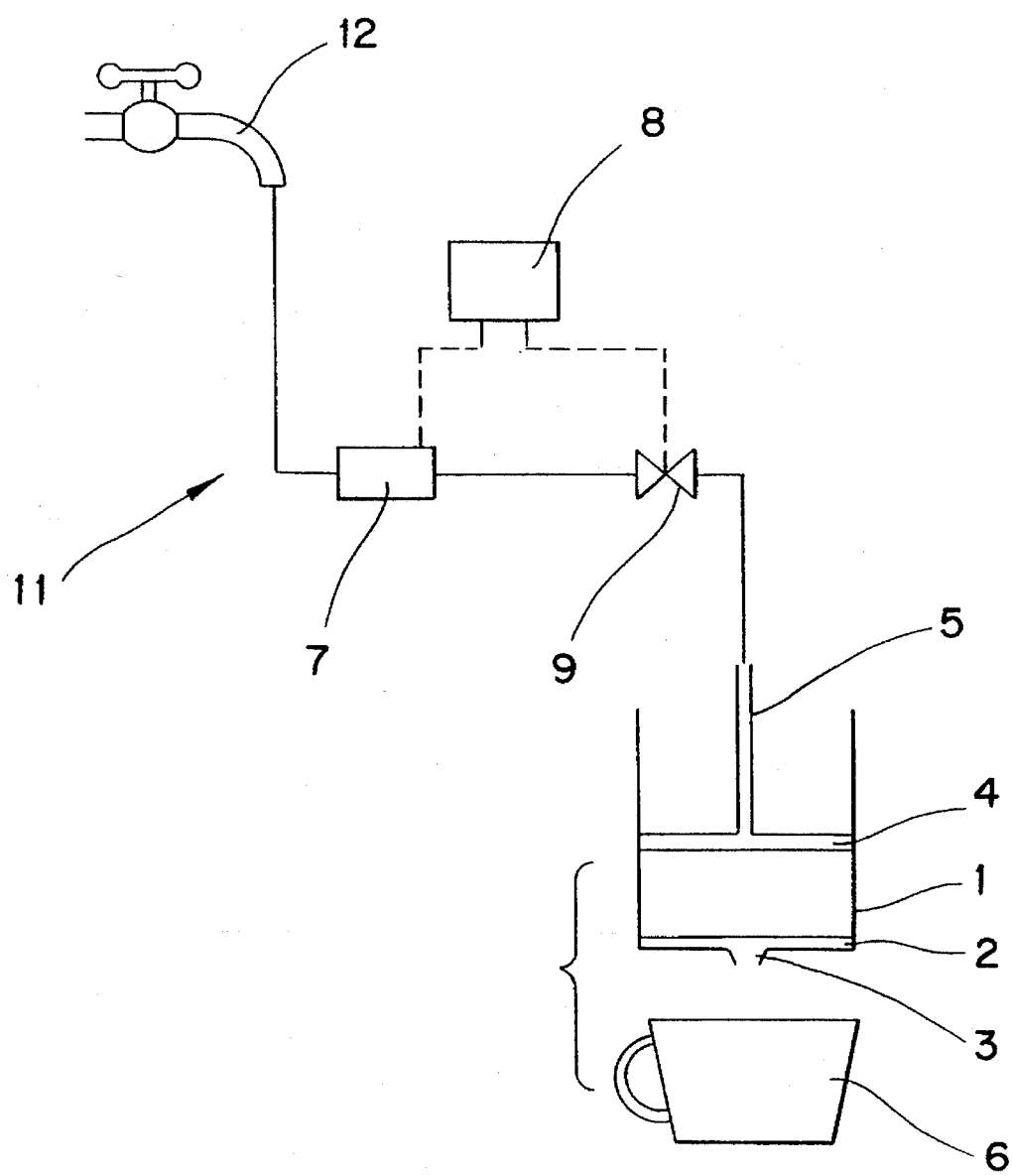
FIG. 1 shows a first diagram with reference to which the method according to the present invention will be clarified.

In the known method for preparing beverages such as coffee, tea, soup or the like through extraction, the product to be extracted is accommodated in a chamber 1 bounded at one axial end by a removable cover 2 with an extract discharge opening 3. The product to be extracted is subsequently confined in this chamber by a piston 4 from an axial end of the chamber 1 located opposite the cover 2. Then, through a liquid supply duct 5 provided in the piston, liquid is supplied to the chamber 1 and the product to be extracted is extracted and the extract is discharged via the extract discharge opening 3. In the depicted diagrams of FIGS. 1 and 2 the extract is discharged into a cup 6. Such a method has the drawback that the size of the chamber 1 and the pressure at which the liquid is supplied determine to a large extent the strength of the extract to be prepared. Too much starting product in a chamber with too small a bottom surface leads to a longer time of contact between liquid and starting product and accordingly to a strong extract, whilst too little product in a chamber with a relatively large bottom surface leads to a very short time of contact between liquid and starting product and accordingly to a weak extract. Therefore, several chambers of different dimensions must be provided for the different extract qualities.

According to the invention, a parameter is measured during the supply of liquid, which parameter corresponds with the amount of liquid supplied, and, depending on these measurements, the supply of liquid is regulated in such a manner that for a specified desired total amount of extract the time of contact between the liquid and the product to be extracted has a predetermined desired duration. The parameter being measured may for instance be the flow rate of the liquid supply but also other related quantities, such as the velocity of the liquid being supplied. In the present example, however, the flow rate is measured.

The measurement of the flow rate can for instance be effectuated with a flow meter 7. The data measured by this flow meter are passed on to a control 8. The control 8 can then actuate means 9 and 10, respectively, for controlling the supply of liquid.

With such a method, extracts of different strengths can be prepared in a chamber 1 with standard dimensions. This provides the advantage that the apparatus for practicing the method is suitable for the preparation of different extract qualities, so that such an apparatus can be employed in the United States, where a weak extract is desired, in particular in the case of coffee, as well as in Denmark, where coffee is generally made somewhat stronger.

It is particularly advantageous if the duration of the time of contact is substantially equal for all amounts of extract to be prepared.

This provides the advantage that the preparation of a cup of coffee and the preparation of a pot of coffee take approximately the same amount of time. Moreover, as a result the preparation of an American cup of coffee takes as long as the preparation of a Danish cup of coffee.

It has been found in practice that it is acceptable if the duration of the time of contact is approx. 10–20 seconds at a liquid supply pressure of approx. 2 bar.

Figure 2:
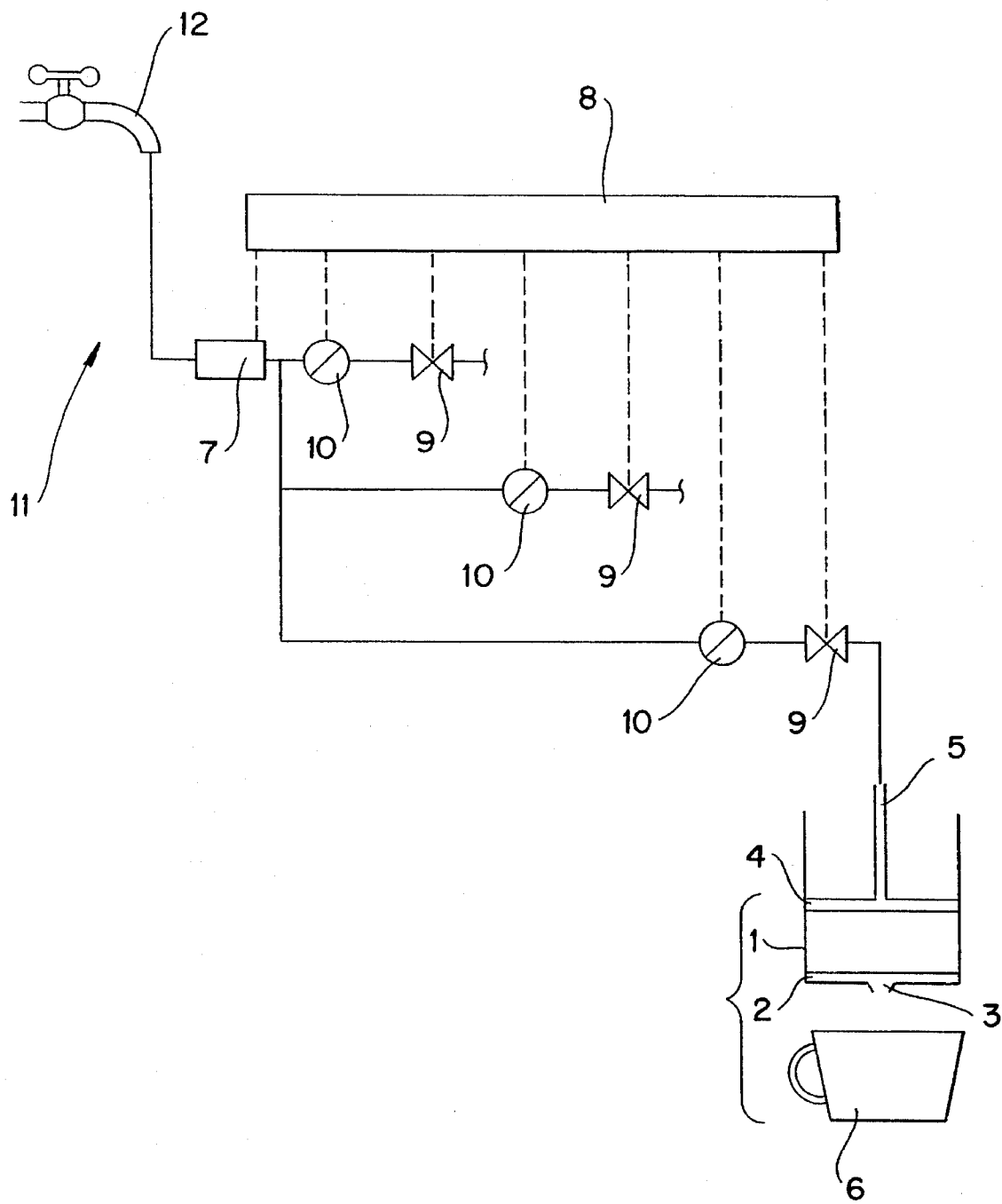
FIG. 2 shows a second diagram with reference to which an alternative embodiment of the method according to the invention will be clarified.

The flow rate at which the liquid is supplied to the chamber 1 can be regulated continuously. This may for instance be effected by means of a flow control valve 10 as shown in FIG. 2, controlled by control 8.

In an alternative elaboration of the method, the supply of liquid can be interrupted periodically for a short period, such that the desired total amount of liquid is supplied over the total span of the desired time of contact.

Such regulation can be effected by means of the shut-off valve 9, actuated by the control 8, shut-off valve 9 being required anyhow for stopping the liquid supply.

Figure 3:
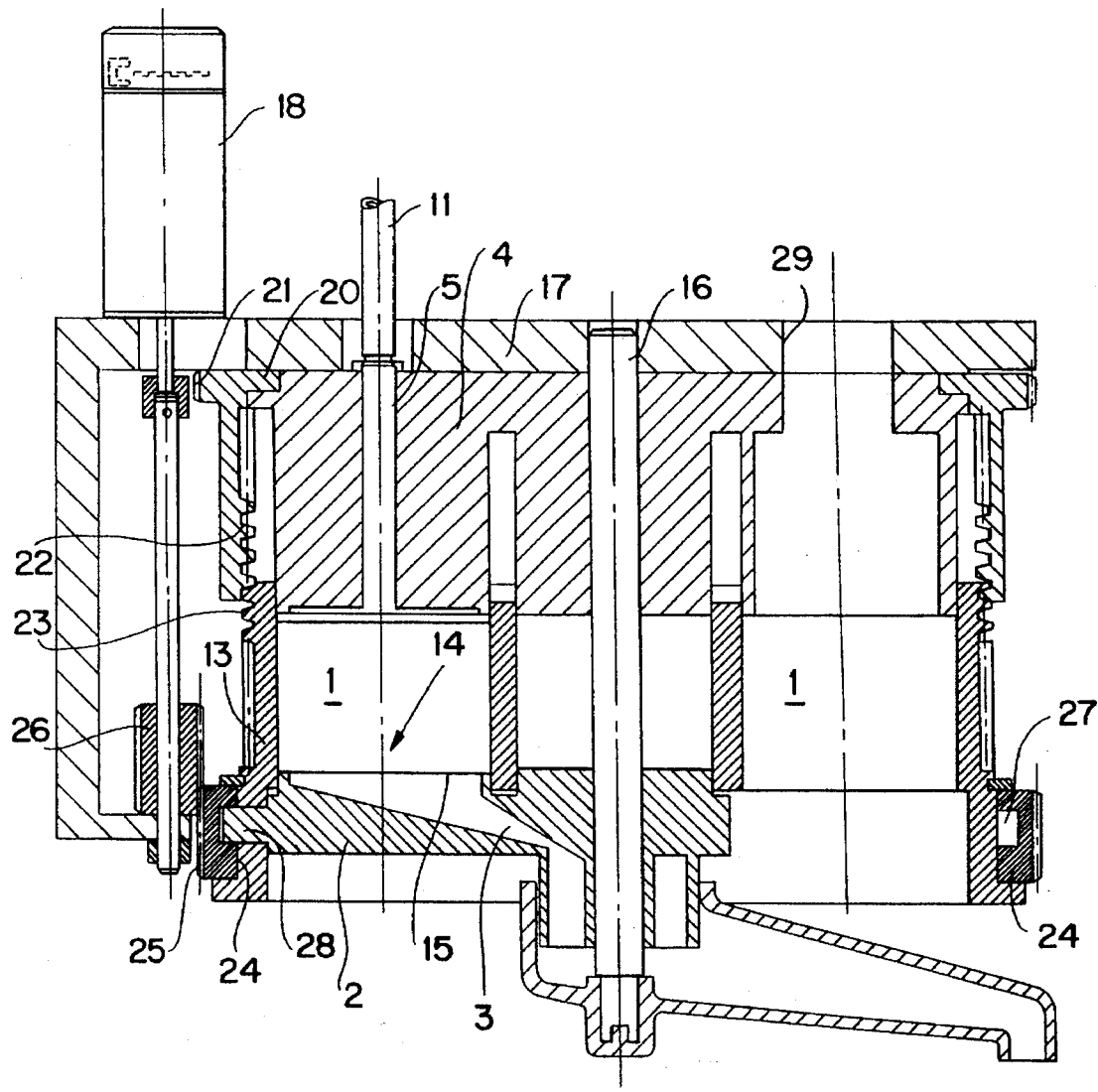
FIG. 3 shows a sectional view of an exemplary embodiment, taken on line III—III of FIG. 4.
Figure 4:
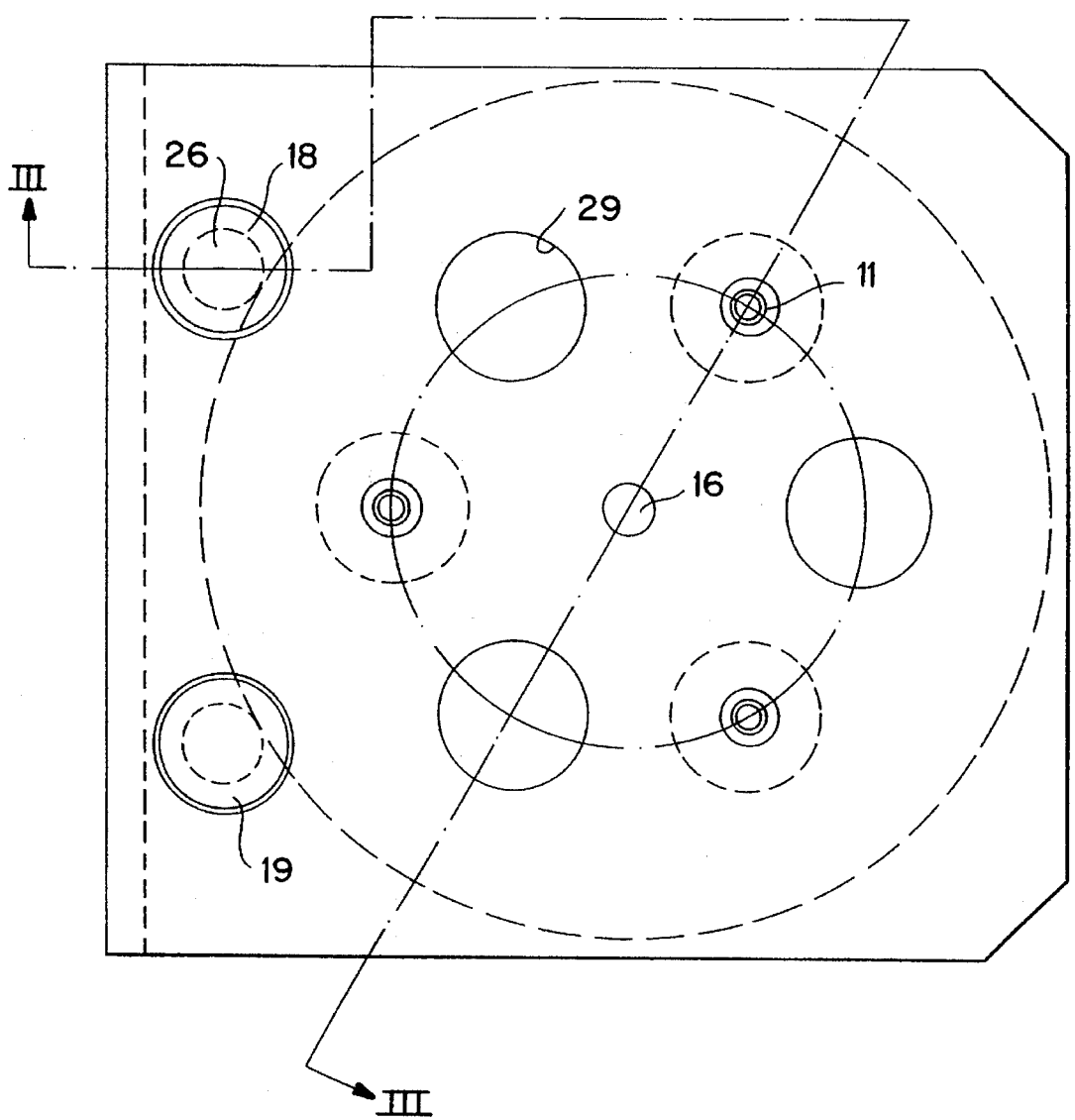
FIG. 4 shows a top plan view of the exemplary embodiment shown in FIG. 3.

The present invention further relates to an apparatus which will be further clarified on the basis of an exemplary embodiment that is shown in FIGS. 3–5. The apparatus in the exemplary embodiment comprises:

a first housing part 13 with three chambers 1 which are adapted for receiving a starting product to be extracted and which, at least at one axial end, are each provided with an opening 14 which is closable with a cover 2 provided with an extract discharge opening 3;

three pistons 4 each slidable relative to the chambers 1 in axial direction of the respective chambers 1 and each adapted for confining in the chamber 1 an amount of starting product to be extracted, the chamber being bounded by the chamber walls, the cover 2 and the piston 4 (the cover 2 is provided with three screen plates 15 which seal the opening 14 to the starting product but are permeable to liquid);

at least one liquid supply device 11 (see FIGS. 1, 2) comprising a flow meter 7 for measuring a parameter corresponding with the amount of liquid supplied and at least one shut-off valve 9 for interrupting the supply of liquid, the liquid supply device 11 being connectible by an inlet thereof to a liquid source 12, such as for instance the water supply system, and being connectible by at least one outlet thereof to liquid supply ducts 5 provided in the pistons, the liquid supply ducts 5 being adapted for supplying liquid to the relevant chamber 1; and a control 8 adapted for controlling the entire apparatus.

The apparatus is characterized in that the chambers 1 have equal dimensions and that the control 8 is so designed that for a specified desired amount of extract the time of contact between the liquid and the product to be extracted has a predetermined duration.

As described hereinabove, this can be realized by virtue of the control 8 being adapted for periodically opening and closing the shut-off valve 9 depending on the flow rate measured.

In an alternative embodiment this can be achieved, as described hereinabove, by virtue of the liquid supply device 11 being provided with a flow control valve 10 which can be controlled through the control 8.

According to an advanced embodiment of the invention, the apparatus comprises three liquid supply devices 11 each connected to a liquid supply duct 5 (only one liquid supply device 11 is illustrated in FIG. 1). Each liquid supply device 11 comprises a flow meter 7 and a shut-off valve 9, optionally with a flow control valve 10 not depicted in FIG. 1, so that the time of contact can be controlled for each chamber 1—and, if desired, for several chambers simultaneously—on an individual basis. According to an advantageous embodiment of the invention, the apparatus comprises a liquid supply device 11 with three shut-off valves 9, which are each, optionally in combination with a flow control valve 10 (as depicted in FIG. 2), connected to a liquid supply duct 5 (only one is illustrated). The apparatus further comprises a flow meter 7 via which liquid is fed to the shut-off valves 9. If the same extract is prepared in the three chambers 1 simultaneously, the control 8 will control the shut-off valves 9—and the flow control valves 10, if any—at least substantially simultaneously and in the same manner, so that time of contact for each chamber 1 will assume a desired value within certain limits. Here, the valves 9, 10 can also be controlled on the basis of the parameter values obtained with the flow meter 7, based on the assumption that the liquid supplied to the liquid supply device 11 will divide uniformly between the three chambers 1. However, if an extract is being prepared in just one of the chambers 1, the control 8 will control the shut-off valve 9—and the flow control valve 10, if any—of the relevant chamber 1 on the basis of the information obtained with the flow meter 7.

The first housing part 13, comprising the chambers 1, of the embodiment shown in FIGS. 3–4, is rotatable about a vertically oriented central axis 16 and is movable in axial direction. The first housing part 13 is accommodated between a fixedly arranged, second housing part 17, carrying the pistons 4, and a third housing part 2 serving as cover, which is likewise rotatable about the vertical axis 16 and movable in axial direction. The apparatus comprises a first drive motor 18, which is adapted for rotationally positioning the first housing part 13 and the third housing part 2, respectively, relative to the second housing part 17, and a second drive motor 19, which is adapted for axially positioning the first housing part 13 and the third housing part 2, respectively, relative to the second housing part 17. The control 8 of the apparatus is adapted for positioning the housing parts 2, 13, 17 relative to each other, whereby in a first position the chambers 1 can be filled with a product to be extracted via filling holes 29; in a second position the product to be extracted is confined in the chamber 1 between the cover 2 and the piston 4 and the supply of liquid and the discharge of extract can take place (left-hand portion of FIG. 3); and in a third position the extracted starting product can be removed (right-hand portion of FIG. 4). The thus functioning apparatus is suitable for preparing a single cup of coffee, with only a single chamber 1 being used, as well as for preparing a pot of coffee, with an extract being prepared in three chambers 1 at the same time.

The apparatus is also suitable for preparing different kinds of cups of coffee in succession, with, for instance, two or three chambers 1 being respectively filled with different kinds of product to be extracted. Here, every chamber 1 can be filled as desired via one of the three filling holes 29, with different kinds of product to be extracted being supplied via different filling holes 29. For the sake of clarity, FIG. 5 schematically shows the operation of the apparatus according to FIGS. 3 and 4.

The apparatus essentially comprises a lower perforated plate, in this case a cover A, an intermediate piece B with chambers and an upper portion C with filling holes or pistons. These parts cooperate in the manner shown in arrangement D and assume the various positions (E)–(H) and (K)–(M) during a movement cycle. In the starting position (E), the perforated plate and the intermediate piece are interconnected. In the next position (F), the chambers are filled via the intermediate piece, after which confinement (position (G)) of the starting product in the chambers takes place by moving the intermediate piece (with the chambers) and the perforated plate towards the upper portion, after which a supply and discharge of medium takes place (position (H)).

In a subsequent position (K), the cover A with the perforated plates is moved downwards, after which the ground coffee used is pushed away (position (L)). In a later position (M), the intermediate piece is again moved downwards and connected to the perforated plate, thereby reaching the starting position (E).

It will be clear that in position (F), one, two or three chambers can be filled. The angle through which cover A and intermediate piece B rotate to move from position (E) into position (F) is approx. 60° or 180°, depending on which chamber is to be filled through which filling hole.

The second housing part 17 has a cylindrical axially extending outer surface and is exteriorly provided with a cylinder 20 rotatably connected therewith, this cylinder being provided externally with teeth 21 and internally with a thread 22. The thread 22 engages with an external thread 23 of the first housing part 13, and the second motor 19 engages the teeth 21 of the cylinder referred to. Further, the apparatus comprises an outer ring 24 for positioning the first housing part 13 and the third housing part 2 relative to each other in axial and circumferential direction. The outer ring 24 is externally provided with teeth 25 meshing with a pinion 26 which can be driven by the first motor 18, and is internally provided with curved slots 27 adapted for cooperation with projections 28 at the circumference of the cover 2. The curved slots provide, upon rotation of the outer ring 24, the axial movement of the third housing part 2 relative to the first housing part 13. Upon further rotation of the outer ring 24, the third housing part 2, optionally together with the first housing part 13, rotates into a different rotary position. Accordingly, when the first motor 18 is excited in a condition wherein the piston 4 is retracted from the chambers 1, the cover 2 carries the first housing part 13 along with it and via filling holes 29 the chambers 1 can be brought into communication with a supply device for coffee powder or the like, as is shown in the right-hand portion of FIG. 3.

When the first motor 18 is excited in a condition wherein the piston 4 is located in the chambers 1, the first housing part 13 is retained by the piston 4. The cover 2 is then forced to move relative to the first housing part 13, whilst a projection/projection guiding path construction, not further described here, ensures that the cover 2 separates from the first housing part 13 to disengage the screen plate 15 from the chambers 1, and is subsequently moved tangentially relative to the first housing part 13. As a result, the coffee dregs left on the screen plate 15 after the coffee brewing process are removed. Upon excitation of the first motor 18 in opposite direction, the screen plate 15 is moved back into its position and re-engages the chambers 1.

Such an apparatus is stable in construction, so that the different movements of the housing parts can be carried out at high speed. A large amount of extract can therefore be produced in a short time.

It will be understood that the invention is not limited to the exemplary embodiment described but that various modifications are possible within the scope of the invention.

I claim:

1. An apparatus for preparing beverages, including coffee, tea, and soup, through extraction, said apparatus comprising:

a first housing part with a plurality of chambers receiving a starting product to be extracted and having equal dimensions, each of said chambers includes an axial end with an opening which is closable with a cover comprising an extract discharge opening;

a plurality of pistons each being slidable in an axial direction of a respective chamber, each said piston confines in a respective chamber an amount of starting product to be extracted, each said chamber being bounded by chamber walls, the cover and a respective piston;

at least one liquid supply device comprising a meter for measuring a parameter corresponding with an amount of liquid supplied and at least one shut-off valve for interrupting the supply device, said at least one shut-off valve is connected by an inlet to a liquid supply system and connected by an outlet to a respective liquid supply duct supplying liquid to a respective chamber; and, a control means for controlling at least one said liquid supply device based on said parameter measured, said control means ensures a predetermined desired duration of contact between the liquid and the product to be extracted for a specified desired amount of extract.

2. The apparatus according to claim 1, characterized in that the control means periodically opens and closes said at least one shut-off valve depending on the parameter measured, in order to achieve the desired duration of contact for the given specified desired amount of extract.

3. The apparatus according to claim 1, characterized in that the liquid supply device comprises a flow control valve controlled via the control means depending on the parameter measured to obtain the desired duration of contact between the liquid and the product to be extracted for a specified desired amount of extract.

4. The apparatus according to claim 1, characterized in that the first housing part is rotatable about a vertically oriented central axis and is movable in said axial direction, the first housing part is interposed between a second housing part fixed with respect to said pistons and a third housing part including said cover, said third housing part is rotatable about the vertical axis and movable in said axial direction; the apparatus further comprising:

a first drive motor rotationally positioning the first housing part and the third housing part relative to the second housing part, and a second drive motor axially positioning the first housing part and the third housing part relative to the second housing part;

the control means positioning the housing parts relative to each other, whereby the chambers can be filled with the product to be extracted in a first position, the product to be extracted is confined in the chambers between the cover and the respective pistons during the supply of liquid and discharge of extract in a second position, and the extracted starting product is removed in a third position.

5. The apparatus according to claim 4, characterized in that the second housing part has a cylindrical axially extending outer surface circumscribed by a cylinder rotatably fixed with respect to said second housing, said cylinder includes external teeth as well as an internal thread, said internal thread engages an external thread on the first housing part, the second motor engages the teeth of said cylinder;

said first housing part further includes an outer ring rotationally and axially positioning the first housing part and the third housing part relative to each other, said outer ring is exteriorly provided with teeth meshing with a pinion driven by the first motor and further provided with internal curved slots cooperating with projections from the cover.

6. The apparatus according to claim 1 further comprising:

at least two liquid supply devices each connected to a respective liquid supply duct of a respective chamber.

7. The apparatus according to claim 6, characterized in that the control means simultaneously controls the duration of contact of at least two chambers.

8. The apparatus according to claim 1, characterized in that said at least one liquid supply device comprises at least two shut-off valves, each shut-off valve in combination with a flow control valve and connected to a liquid supply duct.

9. The apparatus according to claim 8, characterized in that the control means individually controls the duration of the contact of each of the chambers.

10. The apparatus according to claim 1, wherein the control means controls the supply system of liquid such that the duration of contact is substantially equal for all specified desired amounts of extract.

11. The apparatus according to claim 10, wherein the control means controls the supply source of liquid such that the duration of contact is approximately 10–20 seconds given a liquid supply system pressure of approximately 2 bar.

12. An apparatus for preparing beverages, including coffee, tea, and soup, through extraction, said apparatus comprising:

- a first housing part with a plurality of chambers receiving a starting product to be extracted and having equal dimensions, each of said chambers includes an axial end with an opening which is closable with a cover comprising an extract discharge opening;
- a plurality of pistons each being slidable in an axial direction of a respective chamber, each said piston confines in a respective chamber an amount of starting product to be extracted, each said chamber being bounded by chamber walls, the cover and a respective piston;
- at least one liquid supply device comprising a meter for measuring a parameter corresponding with an amount of liquid supplied and at least one shut-off valve for interrupting the supply device, said at least one shut-off valve is connected by an inlet to a liquid supply system and connected by an outlet to a respective liquid supply duct supplying liquid to a respective chamber; and,
- a control means for controlling said at least one liquid supply device based on said parameter measured, said control means ensures a predetermined desired duration of contact between the liquid and the product to be extracted for a specified desired amount of extract;
- wherein the first housing part is rotatable about a vertically oriented central axis and is movable in said axial direction, the first housing part is interposed between a second housing part fixed with respect to said pistons and a third housing part including said cover, said third housing part is rotatable about the vertical axis and movable in said axial direction; the apparatus further comprising:
- a first drive motor rotationally positioning the first housing part and the third housing part relative to the second housing part, and a second drive motor axially positioning the first housing part and the third housing part relative to the second housing part;
- the control means positioning the housing parts relative to each other, whereby the chambers can be filled with the product to be extracted in a first position, the product to be extracted is confined in the chambers between the cover and the respective pistons during the supply of liquid and discharge of extract in a second position, and the extracted starting product is removed in a third position.

13. The apparatus according to claim 12, characterized in that the second housing part has a cylindrical axially extending outer surface circumscribed by a cylinder rotatably fixed with respect to said second housing, said cylinder includes external teeth as well as an internal thread, said internal thread engages an external thread on the first housing part, the second motor engages the teeth of said cylinder;

said first housing part further includes an outer ring rotationally and axially positioning the first housing part and the third housing part relative to each other, said outer ring is exteriorly provided with teeth meshing with a pinion driven by the first motor and further provided with internal curved slots cooperating with projections from the cover.

* * * * *